(12) United States Patent
Kozicki

(10) Patent No.: US 12,552,195 B2
(45) Date of Patent: Feb. 17, 2026

(54) FORMATION OF DENDRITIC IDENTIFIERS BY STAMPING

(71) Applicant: Arizona Board of Regents on behalf of Arizona State University, Scottsdale, AZ (US)

(72) Inventor: Michael N. Kozicki, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 18/867,153

(22) PCT Filed: May 22, 2023

(86) PCT No.: PCT/US2023/023114
§ 371 (c)(1),
(2) Date: Nov. 19, 2024

(87) PCT Pub. No.: WO2023/225399
PCT Pub. Date: Nov. 23, 2023

(65) Prior Publication Data
US 2025/0346060 A1  Nov. 13, 2025

Related U.S. Application Data

(60) Provisional application No. 63/479,673, filed on Jan. 12, 2023, provisional application No. 63/344,369, filed on May 20, 2022.

(51) Int. Cl.
*B42D 25/425* (2014.01)
*B29C 59/02* (2006.01)
*B82Y 40/00* (2011.01)

(52) U.S. Cl.
CPC ............ *B42D 25/425* (2014.10); *B29C 59/02* (2013.01); *B82Y 40/00* (2013.01)

(58) Field of Classification Search
None
See application file for complete search history.

(56) References Cited

U.S. PATENT DOCUMENTS

| 4,551,210 A | 11/1985 | Parthasarathi |
| 5,751,308 A | 5/1998 | Gandy et al. |
| 5,798,050 A | 8/1998 | Gaynes et al. |
| 7,090,880 B1 | 8/2006 | Droste et al. |

(Continued)

FOREIGN PATENT DOCUMENTS

| DE | 102004002410 A1 * | 8/2005 | ............... G09F 3/00 |
| EP | 2973209 B1 | 11/2018 | |

(Continued)

OTHER PUBLICATIONS

A. Lindner, D. Derks, and M. J. Shelley (2005) "Stretch flow of thin layers of newtonian liquids: Fingering patterns and lifting forces," Physics of Fluids, vol. 17, No. 7, 072107, 14 pages.

(Continued)

*Primary Examiner* — Joshua D Zimmerman
(74) *Attorney, Agent, or Firm* — Fish & Richardson P.C.

(57) ABSTRACT

Making a dendritic identifier includes compressing a drop of liquid between a surface of a stamp and a surface of a substrate, and separating the stamp and the substrate to yield a dendritic identifier on the surface of the substrate.

20 Claims, 4 Drawing Sheets

(56) References Cited

U.S. PATENT DOCUMENTS

| | | |
|---|---|---|
| 7,195,187 B2 | 3/2007 | Albers |
| 7,704,346 B2 | 4/2010 | Cote |
| 8,328,349 B2 | 12/2012 | Hook et al. |
| 9,390,920 B2 | 7/2016 | Coe-Sullivan et al. |
| 9,430,733 B2 | 8/2016 | Blondiaux et al. |
| 9,773,141 B2 | 9/2017 | Kozicki |
| 9,836,633 B2 | 12/2017 | Kozicki |
| 10,074,000 B2 | 9/2018 | Kozicki |
| 10,810,731 B2 | 10/2020 | Kozicki |
| 11,430,233 B2 | 8/2022 | Kozicki |
| 11,598,015 B2 | 3/2023 | Kozicki et al. |
| 2002/0098364 A1 | 7/2002 | Bernard et al. |
| 2011/0254117 A1 | 10/2011 | Kozicki |
| 2013/0063898 A1 | 3/2013 | Schuett et al. |
| 2014/0158943 A1 | 6/2014 | Mason |
| 2015/0147585 A1 | 5/2015 | Schwarze et al. |
| 2016/0086001 A1 | 3/2016 | Kozicki |
| 2016/0136992 A1 | 5/2016 | Mai et al. |
| 2018/0088059 A1 | 3/2018 | Kozicki |
| 2018/0286035 A1 | 10/2018 | Kozicki |
| 2020/0117882 A1 | 4/2020 | Kozicki |
| 2021/0157888 A1 | 5/2021 | Kozicki |
| 2021/0230763 A1 | 7/2021 | Kozicki et al. |
| 2022/0027620 A1 | 1/2022 | Kozicki |
| 2022/0129648 A1 | 4/2022 | Kozicki |
| 2023/0326009 A1 | 10/2023 | Kozicki |
| 2023/0331025 A1* | 10/2023 | Kozicki ............... B42D 25/425 |
| 2023/0377115 A1 | 11/2023 | Kozicki |
| 2023/0394857 A1 | 12/2023 | Kozicki |
| 2025/0005308 A1 | 1/2025 | Kozicki |

FOREIGN PATENT DOCUMENTS

| | | |
|---|---|---|
| WO | WO 2019211377 A1 | 11/2019 |
| WO | WO 2020117950 A1 | 6/2020 |
| WO | WO 2022032199 A1 | 2/2022 |
| WO | WO 2023069471 A1 | 4/2023 |
| WO | WO 2023225399 A1 | 11/2023 |

OTHER PUBLICATIONS

Andria. Exploring Dendritic Painting. Drawing Near The Block of Studio 791. May 16, 2016, retrieved from https://andriadrawingnear.blogspot.com/2016/05/exploring-dendritic-painting.html (Year: 2016).
B.S. Kale and K. Bhole (2019) "Parametric Analysis for forming meso fractals from nanoparticle seeded resin in Hele Shaw cell," IOP Conf. Series: Materials Science and Engineering 577, 012154, doi:10.1088/1757-899X/577/1/012154, 9 pages.
Extended European Search Report in European Appln. No. 23808442.0, mailed on Aug. 25, 2025, 12 pages.
International Preliminary Report on Patentability in International Appln. No. PCT/US2023/023114, mailed on Dec. 5, 2024, 9 pages.
International Search Report and Written Opinion in PCT/US2021/045111 dated Jan. 11, 2022, 14 pages.
International Search Report and Written Opinion in International Appln. No. PCT/US2023/023114, mailed on Oct. 6, 2023, 23 pages.
Invitation to Pay Additional Fees and, Where Applicable, Protest Fee in International Appln. No. PCT/US2023/023114, mailed on Jul. 21, 2023.
J. Nase, D. Derks, and A. Lindner (2011) "Dynamic evolution of fingering patterns in a lifted hele-shaw cell," Physics of Fluids, vol. 23, No. 12, 123101, 12 pages.
J.-D. Chen (1989) "Growth of radial viscous fingers in a hele-shaw cell," Journal of Fluid Mechanics, vol. 201, No. 1, p. 223-242.
L. Paterson (1981) "Radial fingering in a hele shaw cell," Journal of Fluid Mechanics, vol. 113, p. 513-529.
M. B. Amar and D. Bonn (2005) "Fingering instabilities in adhesive failure," Physica D: Nonlinear Phenomena, vol. 209, No. 1-4, p. 1-16.
M. J. Shelley, F.-R. Tian, and K. Wlodarski (1997) "Hele-Shaw flow and pattern formation in a time-dependent gap," Nonlinearity, vol. 10, No. 6, p. 1471-1495.
nal.usda.gov [online], Secure Traceability in the Food Supply Chain Using Cell Phone Reable Dendritic Identifiers: Research, Education & Economics Information System (United States Department of Agriculture), Mar. 2023, p. 1-11; https://portal .nifa.usda .gov/web/crisprojectpages/1024109-secure-traceability-in-the-food-supply-chain-using-cell-phone-readable-dendritic-identifiers.html.
O. Alekseev and M. Mineev-Weinstein (2017) "Theory of stochastic Laplacian growth," Journal of Statistical Physics, vol. 168, No. 1, p. 68-91.
P. Brumm, H.M. Sauer and E. Dörsam (2019) "Scaling Behavior of Pattern Formation in the Flexographic Ink Splitting Process," Colloids Interfaces, 3, 37; doi:10.3390/colloids3010037, 16 pages.
P. G. Saffman and G. I. Taylor (1958) "The penetration of a fluid into a porous medium or hele-shaw cell containing a more viscous liquid," Proceedings of the Royal Society of London. Series A. Mathematical and Physical Sciences, vol. 245, No. 1242, p. 312-329. DOI:10.1098/rspa.1958.0085.
Partial Summary European Search Report in European Appln. No. 23808442.0, mailed on Jun. 2, 2025, 14 pages.
Partial Supplementary European Search Report in European Appln No. 21852474.2, mailed on Aug. 20, 2024, 13 pages.
Q. Zhang, M.A. Amooie, M.Z. Bazant, and I. Bischofberger (2004) "Growth morphology and symmetry selection of interfacial instabilities in anisotropic environments," arXiv:2004.02371v1 [physics.flu-dyn]), 9 pages.
R. Chuoke, P. van Meurs, and C. van der Poel (1959) "The instability of slow, immiscible, viscous liquid-liquid displacements in permeable media," Transactions of the AIME, vol. 216, No. 01, p. 188-194.
S. Brulin, I.V. Roisman, and C. Tropea (2020) "Fingering instability of a viscous liquid bridge stretched by an accelerating substrate," J. Fluid Mech., vol. 899, A1, doi:10.1017/jfm.2020.422, 21 pages.
S. Sinha, S.K. Kabiraj, T. Dutta, and S. Tarafdar (2003) "Radially interrupted viscous fingers in a lifting Hele-Shaw cell," Eur. Phys. J. B 36, 297-300, DOI: 10.1140/epjb/e2003-00347-4.
T. Dutta, S. Kabiraj, and S. Tarafdar (2002) "Simulation of hierarchical viscous fingering pattern in lifting hele-shaw cell," arXiv:cond-mat/0212544, arXiv:cond-mat/0212544. [Online]. Available: http://arxiv.org/abs/cond-mat/0212544, 14 pages.
T. Kim, J. Sewall, A. Sud, and M. C. Lin (2007) "Fast simulation of Laplacian growth," IEEE Computer Graphics and Applications, vol. 27, No. 2, p. 68-76.
T. ul Islam & P.S. Gandhi (2016) "Fabrication of multscale fractal-like structures by controlling fluid interface instability," Scientific Reports, 6:37187, DOI: 10.1038/srep37187, 9 pages.
T. ul Islam & P.S. Gandhi (2017) "Spontaneous fabrication of three-dimensional multiscale fractal structures using Hele-Shaw cell," Journal of Manufacturing Science and Engineering, vol. 139, 031007-1, 6 pages.
Twitter.com [online], "The branches form as a less viscous fluid (air) displaces a more viscous fluid (paint) when the glass plates separate," Jun. 24, 2018, retrieved on Nov. 7, 2023, retrieved from URL <https://twitter.com/i/status/1010982033554857985>, 2 pages.
Vimeo.com [online], "Hele-Shaw cell experiments," Apr. 10, 2011, retrieved on Nov. 7, 2023, retrieved from URL <https://vimeo.com/22212386>, 3 pages [Video Submission].

* cited by examiner

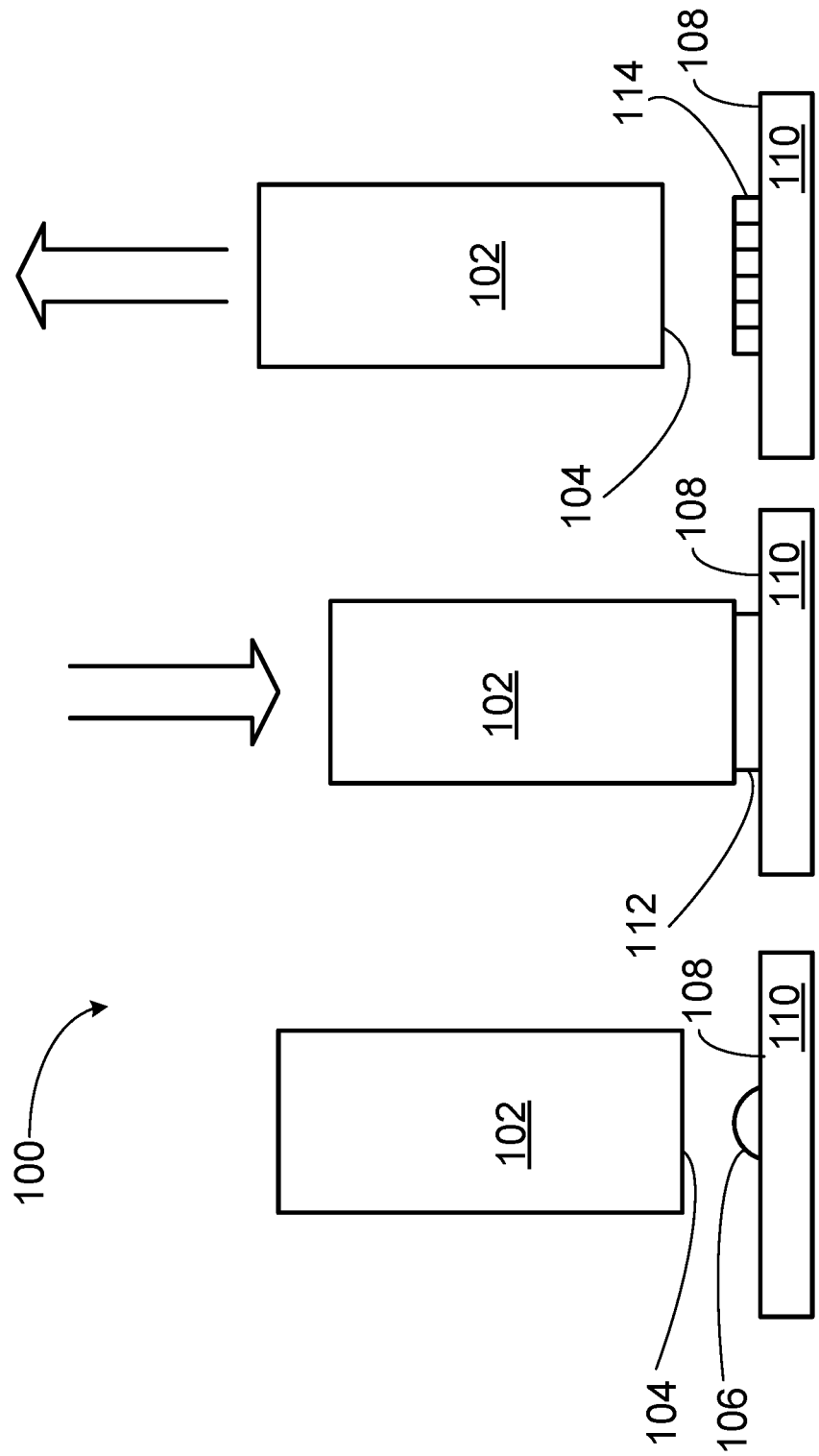

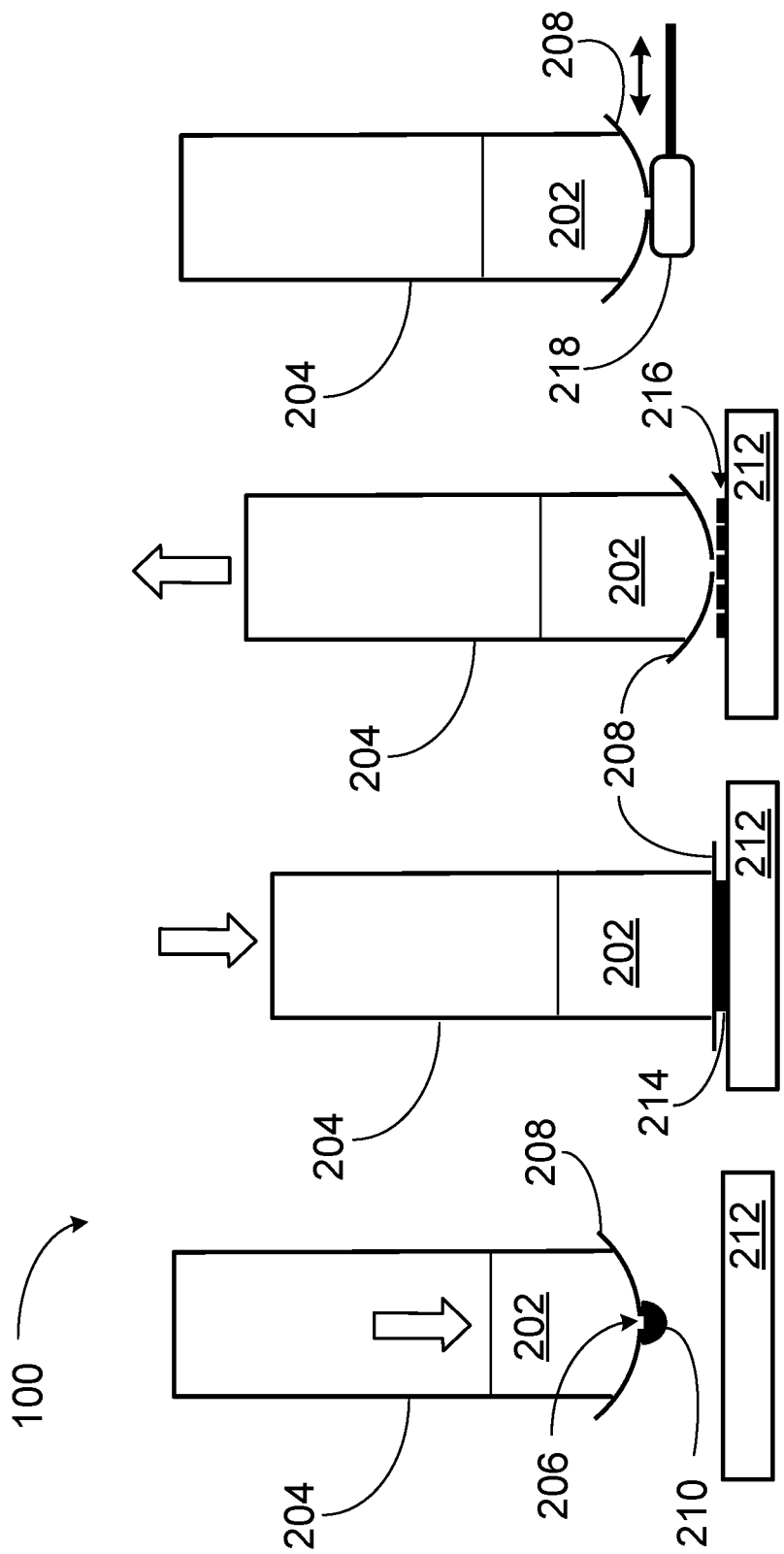

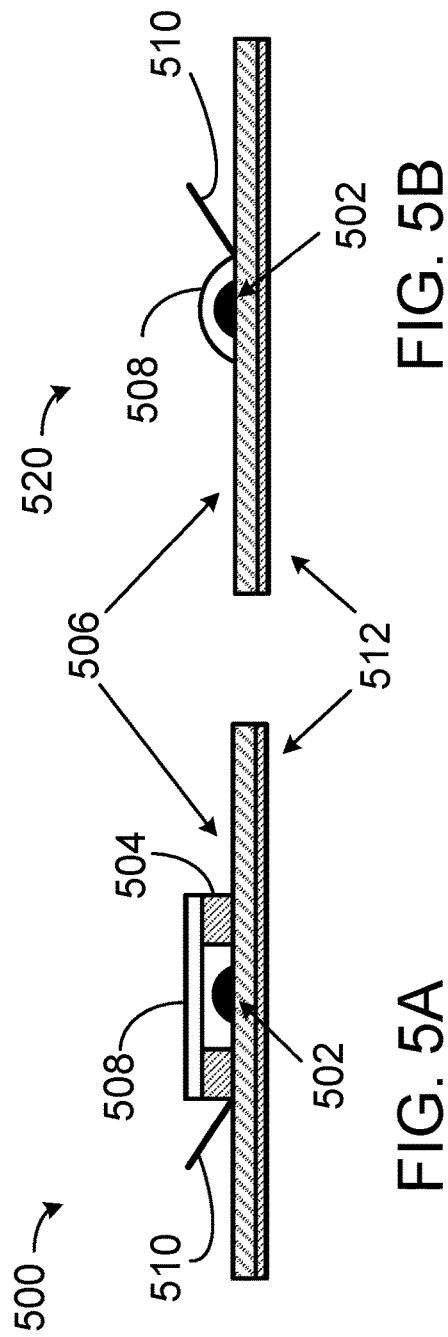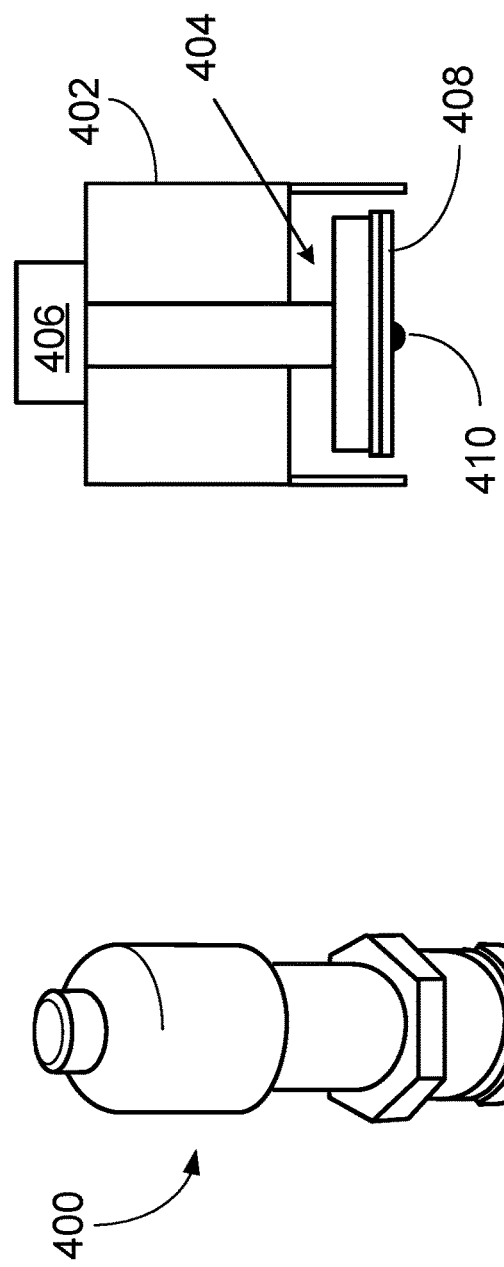

FORMATION OF DENDRITIC IDENTIFIERS BY STAMPING

CROSS-REFERENCE TO RELATED APPLICATIONS

This application is a National Stage Application under 35 U.S.C. § 371 of International Application No. PCT/US2023/023114, filed on May 22, 2023, which claims the benefit of U.S. Patent Application No. 63/344,369 filed on May 20, 2022, and U.S. Patent Application No. 63/479,673 filed on Jan. 12, 2023, all of which are incorporated by reference herein in their entireties.

TECHNICAL FIELD

This invention relates to formation of dendritic identifiers on a substrate by a stamping process in which a drop of liquid is compressed between two surfaces (e.g., a stamp and a substrate).

BACKGROUND

To ensure the safety of supply chains and corresponding networks essential to health and wellbeing, the information therein must be impervious to corruption. Blockchain and hardware-based encryption can inure data systems to errors and malicious action, but the chain of trust is only as strong as its weakest link. In most supply chains, the weak link is a non-secure connection between the items in the channel and their corresponding information in the database, typically in the form of labels with machine-readable symbols (barcodes, etc.).

SUMMARY

This disclosure generally relates to formation of a dendritic identifier on a substrate by a stamping process in which a drop of liquid is compressed between two surfaces (e.g., a stamp and a substrate).

Although the disclosed inventive concepts include those defined in the attached claims, it should be understood that the inventive concepts can also be defined in accordance with the following embodiments.

In addition to the embodiments of the attached claims and the embodiments described above, the following numbered embodiments are also innovative.

Embodiment 1 is a method of making a dendritic identifier, the method comprising:
compressing a drop of liquid between a surface of a stamp and a surface of a substrate; and
separating the stamp and the substrate to yield a dendritic identifier on the surface of the substrate.

Embodiment 2 is the method of embodiment 1, wherein compressing the drop of liquid comprises:
disposing the drop of liquid on the surface of the substrate; and
contacting the drop of liquid with the surface of the stamp, thereby compressing the drop of liquid between the surface of the stamp and the surface of the substrate.

Embodiment 3 is the method of embodiment 2, wherein disposing the drop of liquid on the surface of the substrate comprises dispensing the drop of liquid through an orifice of a nozzle onto the surface of the substrate.

Embodiment 4 is the method of embodiments 2 or 3, wherein disposing the drop of liquid on the surface of the substrate comprises applying the drop of liquid to the surface of the stamp, and contacting the surface of the substrate with the drop of liquid.

Embodiment 5 is the method of embodiment 4, wherein applying the drop of liquid to the surface of the stamp comprises dipping the surface of the surface of the stamp into a reservoir containing a volume of the liquid.

Embodiment 6 is the method of embodiments 4 or 5, wherein applying the drop of liquid to the surface of the stamp comprises dispensing the drop of liquid through an orifice of a nozzle onto the surface of the stamp.

Embodiment 7 is the method of embodiment 1, wherein the surface of the stamp comprises a membrane defining an opening, and compressing the drop of liquid comprises:
dispensing a volume of the liquid through the opening to form the drop of liquid on a surface of the membrane; and
contacting the drop of liquid with the surface of the substrate.

Embodiment 8 is the method of embodiment 7, wherein compressing the drop of liquid comprises translating the membrane toward the surface of the substrate.

Embodiment 9 is the method of embodiments 7 or 8, wherein the surface of the membrane defines a convex surface with respect to the surface of the substrate.

Embodiment 10 is the method of embodiment 9, wherein the convex surface defines a spherical cap.

Embodiment 11 is the method of any one of embodiments 7-10, wherein contacting the drop of the liquid with the surface of the substrate comprises flattening the surface of the membrane against the surface of the substrate.

Embodiment 12 is the method of embodiment 11, wherein flattening the surface of the membrane against the substrate yields a liquid disk between the membrane and the surface of the substrate Embodiment 13 is the method of any one of embodiments 7-12, wherein separating the stamp and the substrate comprises translating the membrane away from the surface of the substrate.

Embodiment 14 is the method of embodiment 13, wherein translating the membrane away from the surface of the substrate comprises restoring a convex shape to the surface of the membrane.

Embodiment 15 is the method of any one of embodiments 7-14, wherein the membrane is hydrophilic.

Embodiment 16 is the method of any one of embodiments 7-15, wherein a contact angle of the liquid on the surface of the membrane is between about 60° and about 70°.

Embodiment 17 is the method of any one of embodiments 1-16, further comprising treating the surface of the substrate before compressing the drop of liquid between the surface of a stamp and the surface of a substrate.

Embodiment 18 is the method of embodiment 17, wherein treating the surface of the substrate comprises altering a surface energy of the surface of the substrate.

Embodiment 19 is the method of embodiment 18, wherein altering the surface energy of the surface of the substrate comprises ablating, irradiating, or chemically treating the surface of the substrate.

Embodiment 20 is the method of embodiment 19, wherein ablating comprises laser ablating.

Embodiment 21 is the method of embodiment 19, wherein irradiating comprises irradiating with ultraviolet or X-ray radiation.

Embodiment 22 is the method of embodiment 19, wherein chemically treating comprises washing with an acid or a base.

Embodiment 23 is the method of embodiment 22, wherein chemically treating comprises applying a primer to the surface of the substrate.

Embodiment 24 is the method of embodiment 23, wherein the primer is washable, edible, non-toxic, or any combination thereof.

Embodiment 25 is the method of any one of embodiments 1-24, wherein compressing the drop of liquid between the surface of a stamp and the surface of a substrate comprises translating the stamp toward the surface of the substrate or translating the substrate toward the surface of the stamp.

Embodiment 26 is the method of any one of embodiments 1-25, wherein compressing the drop of liquid between the surface of the stamp and the surface of the substrate yields a liquid disk between the surface of the stamp and the surface of the substrate.

Embodiment 27 is the method of any one of embodiments 1-26, wherein compressing the drop of liquid comprises a force in a range of 0.5 N and 50 N.

Embodiment 28 is the method of any one of embodiments 1-27, wherein separating the stamp and the substrate comprises translating the stamp away from the substrate or translating the substrate away from the stamp.

Embodiment 29 is the method of any one of embodiments 1-28, wherein a volume of the drop of liquid is in a range of about 0.1 µL to about 10 µL.

Embodiment 30 is the method of any one of embodiments 1-29, wherein a viscosity of the liquid is in a range of about 0.1 Pa's to about 5 Pa's at room temperature.

Embodiment 31 is the method of any one of embodiments 1-30, wherein the liquid comprises reflective particles.

Embodiment 32 is the method of any one of embodiments 1-31, wherein the dendritic identifier is composed of the liquid.

Embodiment 33 is the method of any one of embodiments 1-32, further comprising drying the dendritic identifier.

Embodiment 34 is the method of any one of embodiments 1-33, wherein the liquid comprises a polymer.

Embodiment 35 is the method of embodiment 34, wherein drying the dendritic identifier comprises curing the liquid.

Embodiment 36 is the method of embodiments 34 or 35, wherein the polymer comprises an acrylic polymer.

Embodiment 37 is the method of any one of embodiments 1-36, wherein a perimeter of the dendritic identifier is circular.

Embodiment 38 is the method of any one of embodiments 1-37, further comprising cleaning the surface of the stamp after separating the stamp and the substrate.

Embodiment 39 is the method of any one of embodiments 1-38, wherein the dendritic identifier comprises a multiplicity of branches extending from a root.

Embodiment 40 is the method of embodiment 39, wherein the root is located in an interior of a circle defined by a perimeter of the dendritic identifier.

Embodiment 41 is the method of any one of embodiments 1-40, wherein the surface of the substrate is hydrophilic.

Embodiment 42 is the method of any one of embodiments 1-41, wherein a contact angle of the liquid on the surface of the substrate is between about 60° and about 70°.

Embodiment 43 is a cartridge comprising:
a substrate comprising a stamping surface and a securing surface;
a drop of liquid on the stamping surface; and
a cover enclosing the drop of liquid on the stamping surface.

Embodiment 44 is the cartridge of embodiment 43, further comprising an adhesive on the securing surface.

Embodiment 45 is a direct-to-object stamping tool comprising:
a housing;
a plunger arranged in the housing and configured to couple to a cartridge comprising a drop of liquid; and
an actuator solenoid configured to translate the plunger along a length of the housing.

Embodiment 46 is the tool of embodiment 45, wherein the actuator comprises a solenoid, a hydraulic piston, or a cam-driven spring-returned linear translation mechanism.

Embodiment 47 is a method of making a dendritic identifier, the method comprising:
coupling the cartridge of embodiment 43 or 44 to a surface of the plunger of embodiment 45;
removing the cover from the cartridge;
activating the actuator, thereby translating the plunger toward an opening in the housing;
contacting a surface of a substrate with the drop of liquid on the stamping surface, thereby compressing the drop on the surface of the substrate; and
separating the stamping surface and the substrate to yield a dendritic identifier on the surface of the substrate.

Embodiment 48 is the method of embodiment 47, wherein coupling comprises adhering.

Embodiment 49 is the method of embodiments 47 or 48, further comprising, after separating the stamping surface and the substrate, removing the cartridge from the plunger.

Embodiment 50 is the method of any one of embodiments 47-49, wherein activating the actuator comprises activating a solenoid, a hydraulic piston, or a cam-driven spring-returned linear translation mechanism.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIGS. 1A-1C depict formation of a dendritic identifier by a stamping process embodiment described herein.

FIGS. 2A-2D depict formation of a dendritic identifier by a stamping process embodiment described herein.

FIG. 4A depicts a stamping tool used to form dendritic identifiers by the stamping process as described herein. FIG. 4B is a cross-sectional view of the stamping tool of FIG. 4A, depicting a surface of the stamp in contact with a drop of liquid.

FIGS. 5A and 5B depict cartridges containing a drop of liquid for use with a stamping tool such as that of FIG. 4A.

DETAILED DESCRIPTION

Figure 3B:
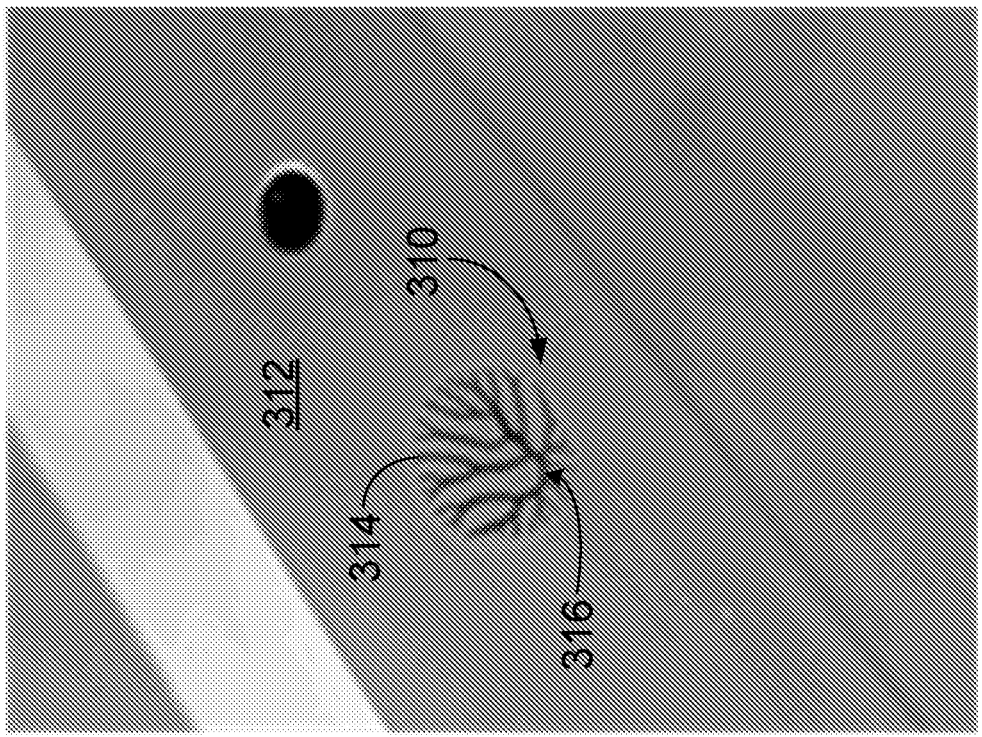
FIGS. 3A and 3B show images of dendritic identifiers formed by a stamping process embodiment described herein.

Methods and systems for fabricating unique stochastically branching patterns that are relatively dense with fine features and diffusion-limited aggregation (DLA)-like branching (e.g., Brownian trees) or densely branching morphologies (DBM) are disclosed. These unique stochastically branching patterns are referred to herein as "dendrites" or "dendritic structures." The dendrites are characterized by a plurality of members ("branches") extending away from a common point of the dendritic structure to form a stochastically branched arrangement of the members. Regions of the dendritic structure are stochastically self-similar to the entire dendritic structure.

In some embodiments, dendritic structures described herein are fabricated by a stamping process 100 such as that depicted in FIGS. 1A-1C. FIG. 1A depicts a stamp 102 with stamping surface 104 positioned above a drop of liquid 106 disposed on a surface 108 of a substrate 110. The drop 106 typically has a volume of about 0.1 μL to about 10 μL.

FIG. 1B depicts compressing the drop 106 between the stamping surface 104 and the surface 108 of the substrate 110. As used herein, the stamping surface generally refers to a portion of the stamp 102 that is configured to contact the drop before and after compression of the drop between the stamp 102 and the substrate 110. Contact between the drop 106 and the surface 108 of the substrate 110 can be achieved by decreasing a distance between the stamp 102 and the substrate 110. In one example, the stamp 102 is translated toward the substrate 110. In another example, the substrate 110 is translated toward the stamp 102. Compressing the drop 104 between the stamping surface 104 and the surface 108 of the substrate 110 forms a liquid disk 112 between the stamping surface 104 and the surface 108 of the substrate.

FIG. 1C depicts separating the stamp 102 and the substrate 110 to yield the dendritic identifier 114 on the surface 108 of the substrate 110. The stamp 102 and the substrate 110 can be separated by increasing a distance between the stamp 102 and the substrate 110, as depicted in FIG. 1C. In one example, the stamp 102 is translated away from the substrate 110. In another example, the substrate 110 is translated away from the stamp 102. Separating the stamp 102 and the substrate 110 allows viscous fingering to penetrate near equally from the entire circumference of the liquid disk 112, terminating at a point near the center of the pattern (i.e., the last point to separate). This will result in a radial dendritic identifier 114 as described herein. The dendritic identifier 114 can be dried (e.g., cured).

In some implementations, disposing the drop of liquid 106 on the substrate 110 includes dispensing the drop 106 through an orifice of a nozzle onto the surface 108 of the substrate 110. In some implementations, disposing the drop of liquid 106 on the substrate 110 includes applying the drop 106 to the stamping surface 104, and contacting the surface 108 of the substrate 110 with the drop 106. Applying the drop 106 to the stamping surface 104 can include dipping the stamping surface 104 into a reservoir containing a volume of the liquid or dispensing the drop 106 through an orifice of a nozzle onto the stamping surface 104. The stamping surface 104 is typically hydrophobic, such that a majority of the liquid is transferred from the stamp 102 to the substrate 110. A smooth stamping surface 104 also facilitates transfer of the liquid to the substrate 110. A shape and size of the stamping surface 104 can be selected as appropriate for the intended application. The stamping surface 104 can be formed of a different material than the body of stamp 102. In some cases, the stamping surface 104 extends from an end of stamp 102, and is removably coupled to the end of the stamp 102. In one example, the stamping surface 104 has a circular circumference.

In some embodiments, dendritic structures described herein are fabricated by stamping process 200 depicted in FIGS. 2A-2C. In process 200, which is similar to process 100, the stamp includes a reservoir for holding the liquid, and the surface of the stamp is a flexible membrane defining an opening to dispense the liquid from the reservoir. FIG. 2A depicts dispensing a liquid 202 from a reservoir 204 through an opening 206 in a flexible membrane 208 to form a drop 210. FIG. 2B depicts compressing the drop 210 between the membrane 208 and a substrate 212 to yield a liquid disk 214. FIG. 2C depicts separating the membrane 208 and the substrate 222 to yield a dendritic identifier 216 on the substrate 212. Following formation of the dendritic identifier, the membrane can be cleaned, for example, with a swab 218 as depicted in FIG. 2D.

Referring to FIGS. 2A-2C, the drop 210 typically has a volume of about 0.1 μL to about 10 μL. The liquid 202 can be forced from the reservoir 204 through the opening 206 in the membrane 208 to form the drop 210 with a selected volume. Opening 206 is typically in a range of a few tens of microns to a few millimeters (e.g, about 10-50 μm to about 5-10 mm). Contact between the drop 210 and the substrate 212 can be achieved by decreasing a distance between the membrane 208 and the substrate 212. In one example, the membrane 208 is translated toward the substrate 212. In another example, the substrate 212 is translated toward the membrane 208. After the drop 210 contacts the substrate 212, the drop 210 can be compressed between the membrane 208 and the substrate 212.

As depicted in FIG. 2A, the membrane 208 can have a convex surface with respect to the substrate 212. In one example, the membrane 208 is a spherical cap. The membrane 208 can be composed of a thin, flexible material. Compressing the drop 210 between the membrane 208 and the substrate 212 flattens the membrane 208 against the substrate 212, compressing the drop 210 into a liquid disk 214 between the membrane 208 and the substrate 212, as depicted in FIG. 2B. In some cases, the membrane 208 is formed of a hydrophilic material, and the liquid 202 is selected such that a contact angle of the liquid 202 on the membrane 208 is between about 60° and about 70°.

After compressing the drop 210 between the membrane 208 and the substrate 212, the membrane 208 and the substrate 212 can be separated by increasing a distance between the membrane 208 and the substrate 212, as depicted in FIG. 2C. In one example, the membrane 208 is translated away from the substrate 212. In another example, the substrate 212 is translated away from the membrane 208. As a distance between the membrane 208 and the substrate 212 is increased, edges of the membrane 208 lift first as the convex membrane shape is restored, allowing the viscous fingering of the liquid to penetrate near equally from the entire circumference of the drop 208, terminating at a point near the center of the pattern (i.e., the last point to separate). This will result in a "radial" dendritic identifier 216. As used herein, a "radial" dendritic identifier generally refers to a dendrite that has an approximately circular shape with an apparent root toward the center of the pattern and branches extending out in all directions. The dendritic identifier 216 can be dried (e.g., cured). In some cases, as depicted in FIG. 2D, the membrane 208 can be cleaned (e.g., with swab 218) between stamping procedures.

Figure 3A:
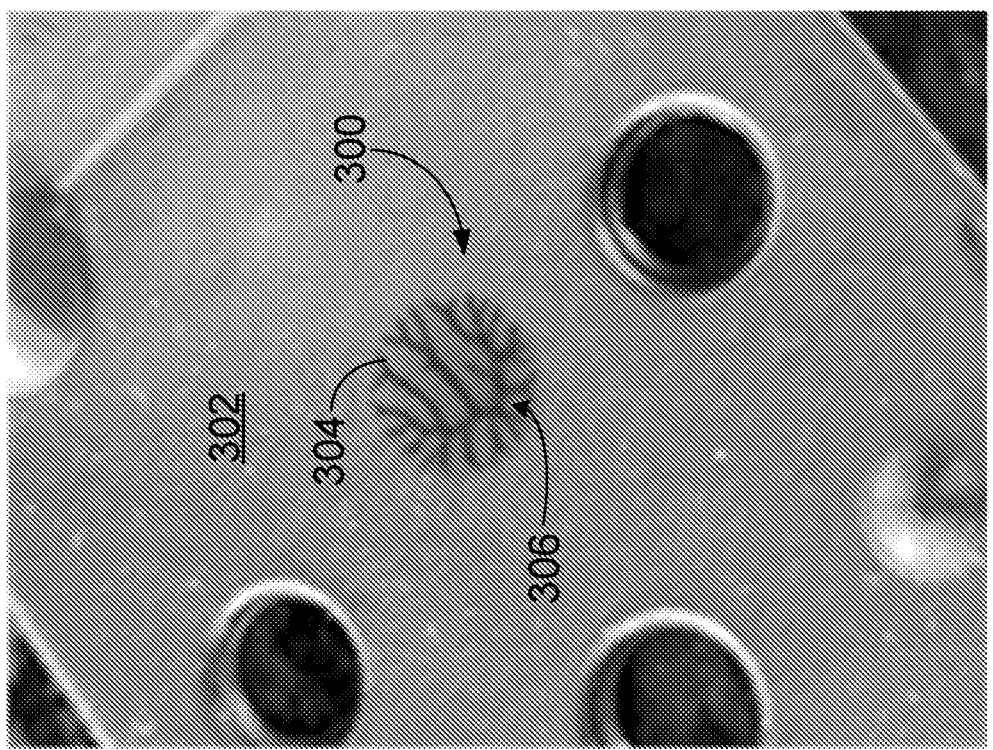

FIGS. 3A and 3B are images of radial dendritic identifiers formed on metal substrates by an embodiment of a stamping process described herein, where the liquid is an acrylic polymer. FIG. 3A shows a dendritic identifier 300 stamped on a galvanized steel substrate 302. Dendritic identifier 300 has an approximately circular shape with branches 304 extending away from a root 306 to form a stochastically branched arrangement of the branches. FIG. 3B shows a dendritic identifier 310 stamped on an aluminum substrate 312. Dendritic identifier 310 has an approximately circular shape with branches 314 extending away from a root 316 to form a stochastically branched arrangement of the branches.

An example of a stamping tool used to form dendritic identifiers by a stamping process is depicted in FIG. 4A. The stamping tool 400 is a single item "direct-to-object" dendritic identifier stamping tool that provides perpendicular stamping action by activating a plunger, a known compression force (e.g., about 0.5 N to about 50 N), and a repeatable lifting force/rate. FIG. 4B is a schematic cross-sectional view of the stamping tool 400, showing a body 402, an actuator 404 coupled to plunger 406, a stamping surface 408, and a drop of liquid 410 on the stamping surface 408. Examples of suitable actuators 404 include solenoids, hydraulic pistons, and cam-driven spring-returned linear translation mechanisms.

FIGS. 5A and 5B depict single-use, pre-loaded, disposable cartridges, each containing a drop of liquid for use with a stamping tool such as stamping tool 400 depicted in FIG. 4A. The cartridges include a pre-measured amount of liquid, and are configured to be coupled to an end of plunger 404 (e.g., with an adhesive), such that the drop of liquid faces the substrate on which the dendritic identifier is to be formed. Each cartridge typically has a removable cover that inhibits the liquid from leaking from the cartridge or drying out. The surface energy of the stamping surface can be selected to achieve a desired spread of the liquid on the stamping surface.

Cartridge 500 depicted in FIG. 5A includes drop of liquid 502 and has one or more spacers 504 between the stamping surface 506 and the cover 508. The material of the spacer(s) 504 and cover 508 can be selected to have a high surface energy/hydrophobicity, so that the liquid 502 doesn't adhere to the spacer(s) 504 or the cover 508. In one example, the spacer(s) 504 and the cover 508 are composed of silicone. Cartridge 500 can include a tab 510 configured to facilitate removal of cover 508 before a stamping process is initiated. A surface opposite the stamping surface 506 of cartridge 500 has an adhesive layer 512 for adhering the cartridge 500 to a plunger of a stamping tool, such as plunger 404 of the stamping tool 400 depicted in FIGS. 4A and 4B. FIG. 5B depicts cartridge 520, in which the cover 508 is in the form of a raised cap or bubble that makes little if any contact with the liquid 502 on stamping surface 506. The material of the cover 508 can be selected to have a high surface energy/hydrophobicity, so that the liquid 502 doesn't adhere to the the cover 508. In one example, the cover 508 is composed of silicone. The cover 508 can be configured for easy removal (e.g, with a removal tab 510). A surface opposite the stamping surface 506 of cartridge 520 has an adhesive layer 512 for adhering the cartridge 520 to a plunger of a stamping tool, such as plunger 404 of the stamping tool 400 depicted in FIGS. 4A and 4B.

A stamping tool (e.g., stamping tool 400) can be loaded with a cartridge (e.g., cartridge 500 or 520) by applying the cartridge 500, 520 to the plunger 404 with the cover 508 away from the plunger 404 (e.g., by adhering the cartridge 500, 520 to the plunger 404 with the adhesive 512 opposite the stamping surface 506). The cover 508 (and spacer 504, if present) can be removed, for example, by pulling on a removal tab 510 on the cover 508. The stamping tool 400 can be activated such that the plunger 404 is advanced and the drop of liquid 502 is compressed between the stamping surface 506 and a substrate on which the dendritic identifier is to be formed. After stamping, the cartridge 500, 520 can be removed from the plunger, 404 leaving the stamping tool 400 ready for reuse.

Some implementations of stamping processes described herein (e.g., stamping processes 100 and 200 depicted in FIGS. 1A-1C and 2A-2C, respectively) include treating the surface of the substrate before disposing the drop of liquid on the surface of the substrate. Treating the surface of the substrate can include altering a surface energy of the substrate. Altering the surface energy of the substrate can include ablating the substrate (e.g., laser ablating), irradiating the substrate (e.g., with ultraviolet or X-ray radiation), or chemically treating the substrate (e.g., washing the substrate with an acid or a base). In some cases, chemically treating the substrate includes applying a primer to the substrate. The primer can be selected for its bulk properties. For example, a primer can be selected to be washable, edible, non-toxic, or any combination thereof.

In some cases, the liquid for use in stamping processes described herein can be referred to as an ink. The liquid can be selected to have a contact angle on the surface of the substrate in a range of 60° to 70°. In some cases, the liquid is colorless. In certain cases, the liquid includes a colorant to enhance visibility of the dendritic structure. In some cases, the liquid is optically transparent. In some cases, the liquid includes a fluorescent substance that fluoresces when irradiated with light (e.g., ultraviolet light). The liquid can be electrically conductive or electrically non-conductive.

The liquid for use in the stamping processes herein can include a gel, an oil, a polymer (e.g., a solubilized polymer or an emulsion of polymer particles in a solvent), or polymerizable monomers (e.g., (meth)acrylate monomers). The liquid can be solidified (e.g., dried or cured) by evaporation of the solvent or exposure to air or light (e.g., UV radiation). In some cases, the liquid includes a hardener (e.g., a free radical initiator or a photoinitiator). Suitable liquids include acrylic paint media and steel-reinforced acrylic. In one example, acrylic paint media is an emulsion of acrylic resin particles in a solvent (e.g., water). In some cases, the emulsion includes one or more additional types of polymeric particles. The acrylic resin and other polymer particles are generally insoluble in water. The emulsion typically includes one or more pigments and surfactants. As the water evaporates after formation of the dendritic structure, the polymeric particles are drawn closer, until they touch and fuse together. This coalescence and produces a honeycomb-like pattern. Pigment particles are trapped in the honeycomb pattern, producing a paint film that is highly flexible with great adhesion.

In some cases, the liquid is food safe. Examples of suitable food-safe materials include Generally Recognized as Safe (GRAS) substances, such as glycerin, gelatin, wax, polyvinyl alcohol, acacia gum, seeded supersaturated sugar solutions, carnauba wax, tree resin, and kaolin clay.

Particulate matter can be combined with the liquid prior to deposition or on the uncured liquid after formation of the dendritic identifier. The particulate matter can be in forms such as flakes or crystals. The particulate matter can be electrically conductive (e.g., metallic) or non-conductive. Examples of food-safe, non-conductive particles include crystals of sugar, salt, gelatin, or the like. A size of the particulate matter is typically in a range of about 1 μm to about 400 μm. In some cases, the particulate matter includes nanoscale aggregates. A density of the particulate matter in the liquid (e.g., number of particles per microliter of liquid) is typically in a range of 10 to 10,000.

In some cases, the liquid includes a surfactant (e.g., detergent) to reduce surface tension. The liquid can be a mixture of two or more components that are mixed to form a homogeneous mixture before use. In some cases, the liquid has a viscosity in a range of about 0.1 Pa·s to about 5 Pa·s at room temperature (e.g., 20° C.). The resulting dendritic identifier has a high information density (i.e., a vast number of possible versions), and can be "read" (identified) with appropriate algorithms. In general, a liquid in the higher range of viscosity (greater than about 1 Pa·s) yields a three-dimensional dendritic structure with a variable thickness with respect to the surface on which it is formed. This variable thickness can be detected using low angle illumination, which will light up facets that are facing the light source to create bright features in the image. Different illumination directions will light up different facets, so the presence of a three dimensional pattern (rather than a two dimensional pattern) is apparent. The way that the liquid separates in the stamping process can lead to unique topography in each dendritic structure. That is, there can be subtle thickness variations along the length of each branch, increasing the difficulty of cloning of these patterns.

In one example, the liquid is an emulsion of acrylic polymer particles in water. A surfactant can be used to keep the particles suspended. The emulsion is a clear viscous liquid that can be mixed with pigment to give it a tint (transparent) or deep color (opaque). The liquid solidifies by the evaporation of water and the "fusing" of the particles when they contact each other. The resulting material has microscopic gaps between the fused particles which trap the pigment particles. This structure can also be used for trapping functional materials that react to light, radiation, heat, chemicals, biological elements, etc.

In another example, the liquid includes a hardener and monomers, oligomers, polymeric particles, or a combination thereof. The hardener chemically fuses the polymeric particles together or polymerizes the monomers or oligomers. Suitable hardeners include amines (e.g., aliphatic amines, amine adducts, amine terminated polyamides). Two part (resin+hardener) systems solidify quickly and result in a solid/less porous material that is resistant to abrasion, moisture, and chemical attack. These dendritic structures can be used in harsh environments. Steel reinforced epoxy is a one example of this type of dendritic structure, as the resin binds strongly to the metal particles as well as to itself, forming a strong material that is resistant to mechanical forces and heat.

In yet another example, the liquid includes UV curable resins. UV curable resins can include epoxy monomers that are polymerized by a photo-initiator under exposure to ultraviolet light. The dendritic structure solidifies quickly under UV illumination, with a short, controllable curing time.

In yet another example, a dendritic structure is solidified by crystallization. Liquids suitable for crystallization include honey and other sugar solutions (e.g., syrups). Crystallization can be achieved by heating after formation of the dendritic structure to promote crystallization.

In yet another example, solidification can be achieved by cooling (e.g., freezing) a dendritic structure from an elevated temperature. A suitable liquid includes carnauba wax at a temperature of about 50-60° C. Subsequent cooling to room temperature results in solidification of the dendritic structure. In addition to carnauba wax, liquids that include shellac and beeswax can also be solidified by cooling.

In some cases, the substrate is a label (e.g., a produce label) or packaging. Suitable materials for the substrate includes glass, plastic (e.g., polyethylene terephthalate), metal (e.g., stainless steel), synthetic paper, and resin-coated paper. The substrate can be flexible (including stretchable) or rigid. The surface of the substrate can be substantially planar. In some cases, the surface of the substrate has a root mean square surface roughness of about 50 µm or less (e.g., for metals) or about 1 µm or less (e.g., for plastics). In some cases, the surface of the substrate has protrusions, recessions, or both. In certain cases, the surface of the substrate has been treated (e.g., etched with an acid or base) or coated (e.g., with an adhesive material) before the liquid contacts the surface of the substrate.

The dendritic identifier can be solidified to yield an approximately circular structure with a maximum diameter in a range of about 5 mm to about 5 cm. Methods of drying include evaporation of a solvent (e.g., water) in the liquid, hardening the liquid via a hardener, curing the liquid with ultraviolet radiation, crystallizing the liquid, and freezing the liquid.

Dendritic structures fabricated as described herein can be functionalized by including one or more additives in the liquid, and attaching the dendritic structure as a label on an item (e.g., produce, pharmaceuticals, etc.). In one example, an additive that changes color irreversibly when a particular temperature is exceeded can be used as an indicator that a cold chain has been broken. In another example, an additive that changes color irreversibly when the dendritic structure is exposed to light (e.g., for a selected length of time or at a selected wavelength) can be used as an indicator of exposure to light. Other additives include additives that change color irreversibly when the dendritic structure is exposed to water or a threshold humidity level, a selected type of radiation (e.g., gamma radiation, X-rays, etc.), specific chemicals (e.g., chorine), or biological agents (e.g., bacteria such as *E. coli*).

Authenticating a dendritic identifier formed by processes describe herein can include measuring a height of each point of a first multiplicity of points on a first stochastically branching pattern from a surface from which the first stochastically branching pattern extends, comparing the height of each of the first multiplicity of points with a height of each of a second multiplicity of corresponding points on a second stochastically branching pattern, and assessing a difference in height between each corresponding point of the first multiplicity of points and the second multiplicity of points.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of making a dendritic identifier, the method comprising:
compressing a drop of liquid between a surface of a stamp and a surface of a substrate; and
separating the stamp and the substrate to yield a dendritic identifier on the surface of the substrate.

2. The method of claim 1, wherein compressing the drop of liquid comprises:
disposing the drop of liquid on the surface of the substrate; and
contacting the drop of liquid with the surface of the stamp, thereby compressing the drop of liquid between the surface of the stamp and the surface of the substrate,
wherein disposing the drop of liquid on the surface of the substrate comprises:
dispensing the drop of liquid through an orifice of a nozzle onto the surface of the substrate; or
applying the drop of liquid to the surface of the stamp, and contacting the surface of the substrate with the drop of liquid.

3. The method of claim 1, wherein the surface of the stamp comprises a membrane defining an opening, and compressing the drop of liquid comprises:
dispensing a volume of the liquid through the opening to form the drop of liquid on a surface of the membrane; and
contacting the drop of liquid with the surface of the substrate.

4. The method of claim 3, wherein the surface of the membrane defines a convex surface with respect to the surface of the substrate.

5. The method of claim 3, wherein contacting the drop of the liquid with the surface of the substrate comprises flattening the surface of the membrane against the surface of the substrate.

6. The method of claim 5, wherein flattening the surface of the membrane against the substrate yields a liquid disk between the membrane and the surface of the substrate.

7. The method of claim 3, wherein separating the stamp and the substrate comprises translating the membrane away from the surface of the substrate, wherein translating the membrane away from the surface of the substrate comprises restoring a convex shape to the surface of the membrane.

8. The method of claim 3, wherein the membrane is hydrophilic.

9. The method of claim 3, wherein a contact angle of the liquid on the surface of the membrane is between about 60° and about 70°.

10. The method of claim 1, wherein compressing the drop of liquid between the surface of the stamp and the surface of the substrate yields a liquid disk between the surface of the stamp and the surface of the substrate.

11. The method of claim 1, wherein a volume of the drop of liquid is in a range of about 0.1 µL to about 10 µL and a viscosity of the liquid is in a range of about 0.1 Pa·s to about 5 Pa·s at room temperature.

12. The method of claim 1, wherein the liquid comprises reflective particles.

13. The method of claim 1, wherein the liquid comprises a polymer.

14. The method of claim 13, further comprising drying the dendritic identifier, wherein drying the dendritic identifier comprises curing the liquid.

15. The method of claim 13, wherein the polymer comprises an acrylic polymer.

16. The method of claim 1, wherein a perimeter of the dendritic identifier is circular.

17. The method of claim 1, wherein the dendritic identifier comprises a multiplicity of branches extending from a root.

18. The method of claim 17, wherein the root is located in an interior of a circle defined by a perimeter of the dendritic identifier.

19. The method of claim 1, wherein the surface of the substrate is hydrophilic.

20. The method of claim 1, wherein a contact angle of the liquid on the surface of the substrate is between about 60° and about 70°.

* * * * *